(12) United States Patent
Kumagai et al.

(10) Patent No.: US 10,879,015 B2
(45) Date of Patent: Dec. 29, 2020

(54) VIOLOGEN COMPOUND, METHOD FOR PRODUCING THE SAME, NEGATIVE ELECTRODE ACTIVE MATERIAL, AND ELECTRICITY STORAGE DEVICE

(71) Applicant: KABUSHIKI KAISHA TOYOTA CHUO KENKYUSHO, Nagakute (JP)

(72) Inventors: Hitoshi Kumagai, Nagakute (JP); Yuka Makino, Nagakute (JP); Masaki Hasegawa, Nagakute (JP); Nobuhiro Ogihara, Nagakute (JP)

(73) Assignee: KABUSHIKI KAISHA TOYOTA CHUO KENKYUSHO, Nagakute (JP)

( * ) Notice: Subject to any disclaimer, the term of this patent is extended or adjusted under 35 U.S.C. 154(b) by 98 days.

(21) Appl. No.: 16/198,931

(22) Filed: Nov. 23, 2018

(65) Prior Publication Data
US 2019/0180950 A1 Jun. 13, 2019

(30) Foreign Application Priority Data

Dec. 8, 2017 (JP) .................................. 2017-235808

(51) Int. Cl.
| | |
|---|---|
| C07F 1/02 | (2006.01) |
| C07F 1/04 | (2006.01) |
| C07F 1/06 | (2006.01) |
| H01M 4/02 | (2006.01) |
| H01G 11/48 | (2013.01) |
| H01G 11/50 | (2013.01) |
| C07F 5/02 | (2006.01) |

(52) U.S. Cl.
CPC .............. *H01G 11/48* (2013.01); *C07F 1/02* (2013.01); *C07F 5/02* (2013.01); *H01G 11/50* (2013.01)

(58) Field of Classification Search
CPC ........... H01G 11/22; H01G 11/30; C07F 1/00; C07F 1/02; C07F 1/04; C07F 1/06; H01M 4/381; H01M 4/382; H01M 4/60; H01M 2004/026; H01M 2004/027
See application file for complete search history.

(56) References Cited

U.S. PATENT DOCUMENTS

2018/0314125 A1 11/2018 Goto et al.

FOREIGN PATENT DOCUMENTS

| JP | 2009-295922 A | 12/2009 |
|---|---|---|
| JP | 2012-022924 A | 2/2012 |
| JP | 2012-221885 A | 11/2012 |
| JP | 2012-221886 A | 11/2012 |
| JP | 2016-154086 A | 8/2016 |
| JP | 2017-107153 A | 6/2017 |

OTHER PUBLICATIONS

Ma et al; "Mixed azide-carboxylate bridged tri- and tetranuclear MnII clusters in coordination polymers derived from a zwitterionic dicarboxylate ligand: structures and magnetism;" The Royal Society of Chemistry; Dalton Transactions; vol. 39; pp. 7714-7722; Jun. 4, 2010.
Yang Ye et al, "Self-Assembly of [3]Catenanes and a [4]Molecular Necklace Based on a Cryptand/Paraquat Recognition Motif" Organic Letters, vol. 17, May 21, 2015. pp. 2804-2807.
Jan. 28, 2020, Japanese Office Action issued in Japanese Patent Application No. 2017-235808.

*Primary Examiner* — Haidung D Nguyen
(74) *Attorney, Agent, or Firm* — Oliff PLC (57) ABSTRACT

A viologen compound is a crystalline compound including a heterocyclic moiety in which a carboxylate of an alkali metal is bound directly or indirectly to both ends of a basic skeleton containing 4,4☐-bipyridinium and an anionic moiety that pairs with 4,4☐-bipyridinium. The viologen compound can be used, for example, as a negative electrode active material for an electricity storage device including a negative electrode containing the negative electrode active material, a positive electrode containing a positive electrode active material capable of giving and receiving anions, and an ion-conducting medium that is disposed between the positive electrode and the negative electrode and conducts anions.

8 Claims, 9 Drawing Sheets

Fig. 4A
Experimental Example 1

Fig. 4B
Experimental Example 2

Fig. 4C
Experimental Example 3

Fig. 4D
Experimental Example 4

Fig. 4E
Experimental Example 5

VIOLOGEN COMPOUND, METHOD FOR PRODUCING THE SAME, NEGATIVE ELECTRODE ACTIVE MATERIAL, AND ELECTRICITY STORAGE DEVICE

BACKGROUND OF THE INVENTION

1. Field of the Invention

The present disclosure relates to a viologen compound, a method for producing the viologen compound, a negative electrode active material, and an electricity storage device.

2. Description of the Related Art

Electricity storage devices have been proposed that have active materials each including a nitrogen-containing compound and a Si compound having as a basic skeleton a structure in which a plurality of six-membered rings constituted by silicon atoms are linked together and that are charged and discharged by the active materials absorbing and releasing anions (see PTLs 1 to 3). An electricity storage device has also been proposed that has an active material including a repeating structure in which an organic compound such as 4,4□-bipyridine is coordinated to a metal ion and that is charged and discharged by absorbing and releasing anions into and from the repeating structure (see PTL 4).

The use of a viologen compound dissolved in an electrolyte solution as an active material for an energy storage device, the viologen compound having a structure in which substituents are introduced at two nitrogen atoms of 4,4□-bipyridine, has also been proposed (see, for example, PTL 5).

CITATION LIST

Patent Literature

PTL 1: Japanese Unexamined Patent Application Publication No. 2012-221885
PTL 2: Japanese Unexamined Patent Application Publication No. 2012-221886
PTL 3: Japanese Unexamined Patent Application Publication No. 2012-22924
PTL 4: Japanese Unexamined Patent Application Publication No. 2016-154086
PTL 5: Japanese Unexamined Patent Application Publication No. 2009-295922

SUMMARY OF THE INVENTION

However, although PTLs 1 to 4 provide electricity storage devices capable of being charged and discharged by absorption and release of anions, it has been desired to provide other novel electricity storage devices capable of being charged and discharged by absorption and release of anions. PTL 5 has discussed only the use of a viologen compound dissolved in an electrolyte solution. Thus, there has been a need for novel viologen compounds and electricity storage devices.

The present disclosure has been made to solve these problems and aims primarily to provide a novel viologen compound, a method for producing the viologen compound, a negative electrode active material, and an electricity storage device.

To achieve the above-described object, the inventors have conducted intensive studies to discover that a certain type of crystalline viologen compound is useful as a negative electrode active material, thereby completing the present disclosure.

Thus, a viologen compound according to the present disclosure is a crystalline compound including:
  a heterocyclic moiety in which a carboxylate of an alkali metal is bound directly or indirectly to both ends of a basic skeleton containing 4,4□-bipyridinium; and
  an anionic moiety that pairs with the 4,4□-bipyridinium.

A method for producing a viologen compound according to the present disclosure includes:
  a step (a) of providing a heterocyclic compound and an alkali metal compound, the heterocyclic compound including a heterocyclic moiety in which a carboxylic acid is bound directly or indirectly to both ends of a basic skeleton containing 4,4□-bipyridinium and an anionic moiety that pairs with the 4,4□-bipyridinium, and providing a prepared solution in which a molar ratio of the alkali metal to the heterocyclic compound is 2.0 or more and 2.5 or less; and
  a step (b) of spray-drying the prepared solution with a spray dryer to thereby precipitate a crystalline viologen compound in which alkali metal cations of the alkali metal compound are bound to oxygen anions of the carboxylic acid contained in the heterocyclic compound.

A negative electrode active material according to the present disclosure includes the above crystalline viologen compound.

An electricity storage device according to the present disclosure includes:
  a negative electrode containing the above negative electrode active material;
  a positive electrode containing a positive electrode active material capable of giving and receiving anions; and
  an ion-conducting medium that is disposed between the positive electrode and the negative electrode and conducts anions.

According to the method for producing a viologen compound according to the present disclosure, a novel crystalline viologen compound can be produced. The novel crystalline viologen compound is capable of giving and receiving anions and can be used as an active material for an electricity storage device.

DETAILED DESCRIPTION OF THE INVENTION

First, a viologen compound according to the present disclosure will be described. In this specification, the viologen compound refers to a compound having a structure in which substituents are introduced at the nitrogen atoms at both ends of 4,4☐-bipyridine. The viologen compound according to the present disclosure is a crystalline compound including a heterocyclic moiety in which a carboxylate of an alkali metal is bound directly or indirectly to both ends of a basic skeleton containing 4,4☐-bipyridinium, and an anionic moiety that pairs with the 4,4☐-bipyridinium. Whether being crystalline or not can be determined, for example, by the shape of a peak that appears in an XRD profile of the viologen compound.

In the heterocyclic moiety, the basic skeleton containing 4,4☐-bipyridinium may contain at least one 4,4☐-bipyridinium but preferably contains one 4,4☐-bipyridinium. The carboxylate of an alkali metal is preferably bound indirectly to the basic skeleton containing 4,4☐-bipyridinium via an optionally branched alkylene chain or an aromatic hydrocarbon chain. The alkylene chain is preferably a group having 1 to 3 main-chain carbon atoms, more preferably a methylene group. In the branched alkylene chain, the branch may be at least one of a methyl group and an ethyl group. The aromatic hydrocarbon chain is preferably constituted by 1 to 3 phenylene groups. The alkali metal is preferably, but not limited to, at least one selected from the group consisting of lithium, sodium, and potassium, more preferably lithium.

The anionic moiety is preferably, but not limited to, at least one selected from the group consisting of tetrafluoroborate ($BF_4^-$), hexafluorophosphate ($PF_6^-$), hexafluorosilicate ($SiF_6^{2-}$), hexafluoroantimonate ($SbF_6^-$), perchlorate ($ClO_4^-$), tetracyanoborate ($B(CN)_4^-$), tris(pentafluoroethyl)trifluorophosphate ($[(C_2F_5)_3PF_3]^-$), dicyanamide ($[(CN)_2N]^-$), trifluoromethanesulfonate ($CF_3SO_3^-$), trifluoroacetate ($CF_3CO_2^-$), bis(fluorosulfonyl)imide ($N(FSO_2)_2^-$), bis(trifluoromethanesulfonyl)imide ($N(CF_3SO_2)_2^-$), and bis(pentafluoroethanesulfonyl)imide ($N(C_2F_5SO_2)_2^-$), more preferably $BF_4^-$, $PF_6^-$, $SiF_6^{2-}$, $SbF_6^-$, or $ClO_4^-$. These anions have larger ionic radii than halogen anions such as $F^-$, $Cl^-$, $Br^-$, and $I^-$ and show relatively weak interactions with the heterocyclic moiety and other anionic moieties, and thus can probably enhance the stability of the viologen compound. The ionic radii of these anions are not excessively large, and thus these anions can probably be present in the space of the heterocyclic moiety structure in good states.

The viologen compound may be represented, for example, by formula (1). In formula (1), $A^-$ is an anionic moiety, M is an alkali metal, R is an optionally branched alkylene chain or an aromatic hydrocarbon chain, and m is 0 or 1. The viologen compound may be represented by formula (2) or formula (3).

[Chem. 1]

Formula (1)

[Chem. 2]

Formula (2)

Formula (3)

Figure 1:
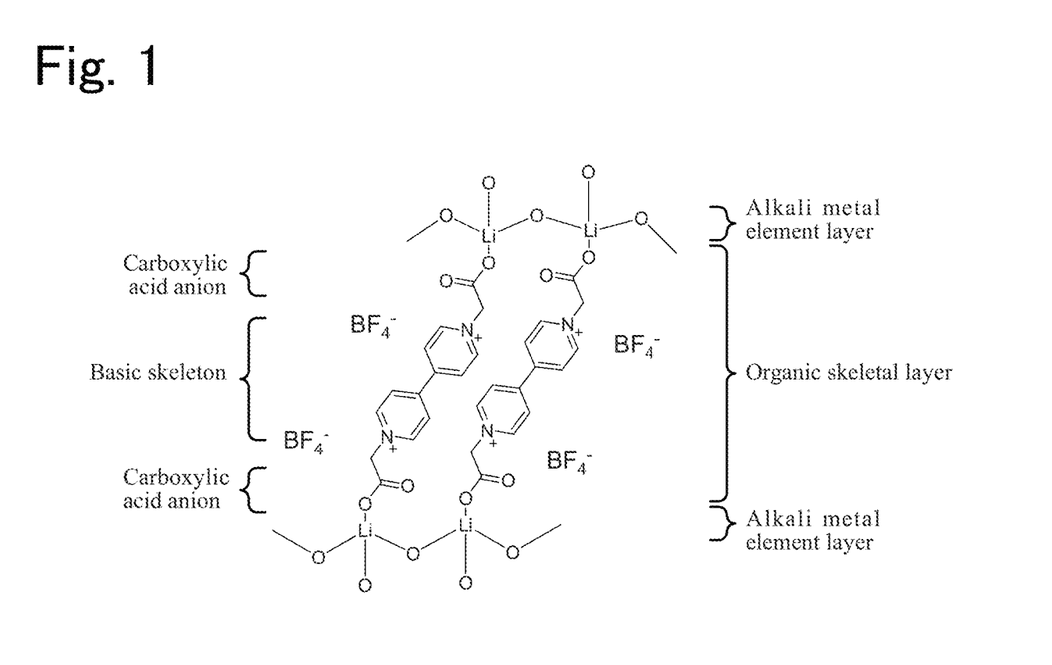
FIG. 1 schematically shows an exemplary structure of a viologen compound.

In the viologen compound, the heterocyclic moiety may be a three-dimensional structure including an organic skeletal layer in which a carboxylic acid anion is bound directly or indirectly to both ends of a basic skeleton and an alkali metal element layer in which an alkali metal is bound to oxygen contained in the carboxylic acid anion. In such a three-dimensional structure, the organic skeletal layer to which an alkali metal element is bound has space, and anions of anionic moieties are probably present in the space. The three-dimensional structure may be a layered structure or may be formed in layers by π-electron interaction of an aromatic heterocyclic compound. The three-dimensional structure may have a structure in which the organic skeletal layers are joined by the alkali metal element. The three-dimensional structure may have a structure in which two or more oxygen atoms of carboxylic acid anions and one alkali metal element are bound together, or may have a structure in which four oxygen atoms of different carboxylic acid anions and one alkali metal element are bound together. FIG. 1 shows an exemplary structure of a viologen compound including a heterocyclic moiety having a three-dimensional structure and an anionic moiety. In the viologen compound shown in FIG. 1, the anionic moiety is $BF_4^-$. In the heterocyclic moiety, lithium carboxylate is bound to nitrogen atoms at both ends of 4,4☐-bipyridinium, which is a basic skeleton, via an unsubstituted methylene group.

The viologen compound may be such that in an XRD profile obtained using CuKα radiation, when the position of a top peak where the intensity is maximum is T°, multiple, e.g., five or more, peaks are observed in the range of $(T-5)° \leq 2\theta \leq (T+5)°$. In the case of a compound having a broad peak, such as an amorphous compound, multiple peaks are presumably not observed in such a narrow range. The viologen compound may be such that in the XRD profile described above, a top peak where the intensity is maximum appears in the range of $2\theta = 20°$ to $25°$.

The viologen compound is preferred to have a spherical shape. The viologen compound may be formed to have a diameter of 10 μm or less or 8 μm or less and 0.1 μm or more or 0.5 μm or more.

The viologen compound may be used, for example, as an electrode active material for an electricity storage device. In this case, the viologen compound may be used for a positive electrode or a negative electrode depending on the potential of a counter electrode, but is preferably used for a negative electrode. When the viologen compound is used as an electrode active material, the anionic moiety is preferably, for example, $BF_4^-$, $PF_6^-$, or $CF_3SO_3^-$. For example, if the anionic moiety is $BF_4^-$, because of its small molecular weight and high ionic conductivity, the theoretical capacity per unit weight of a negative electrode active material can be advantageously increased. If the anionic moiety is $PF_6^-$ or $CF_3SO_3^-$, the theoretical capacity per unit weight of an active material is decreased due to a molecular weight larger than that of $BF_4^-$, but the low-temperature characteristics can probably be increased due to higher ionic conductivity. When the viologen compound is used as an electrode active material, anions of the anionic moieties are probably absorbed into and released from the structure of the viologen compound during charge and discharge. In the viologen compound having a three-dimensionally structured heterocyclic moiety, the organic skeletal layer bound to the alkali metal element has space, and anions are probably absorbed into and released from the space.

Next, a method for producing a viologen compound according to the present disclosure will be described. This production method includes a step (a) of providing a prepared solution and a step (b) of precipitating a viologen compound.

In the step (a), a heterocyclic compound and an alkali metal compound are provided, the heterocyclic compound including a heterocyclic moiety in which a carboxylic acid is bound directly or indirectly to both ends of a basic skeleton containing 4,4□-bipyridinium and an anionic moiety that pairs with 4,4□-bipyridinium, and a prepared solution in which the molar ratio of alkali metal cations of the alkali metal compound to the heterocyclic compound is 2.0 or more and 2.5 or less is provided.

The heterocyclic compound and the alkali metal compound may be appropriately selected depending on the desired viologen compound. The basic skeleton of the heterocyclic compound may be the same as the basic skeleton of the above-described viologen compound. The bond of the carboxylic acid to the basic skeleton may be the same as the bond of the carboxylate of an alkali metal to the basic skeleton in the above-described viologen compound. The anionic moiety may be the same as the anionic moiety of the above-described viologen compound. The alkali metal of the alkali metal compound may be the same as the alkali metal in the above-described viologen compound. The alkali metal compound may be, for example, a hydroxide or a metal compound of the above-described anion, and is preferably a hydroxide.

In this step, a prepared solution may be prepared, or a prepared solution that has already been prepared may be provided. For the prepared solution, any solvent such as an aqueous solvent or an organic solvent may be used, but water is preferred. In this step, a prepared solution in which a molar ratio B/A, which is the ratio of the molarity B (mol) of alkali metal cations of the alkali metal compound to the molarity A (mol) of the heterocyclic compound, is 2.0 or more and 2.5 or less, more preferably 2.1 or more and 2.3 or less, may be provided. Within this range, a crystalline viologen compound can be obtained. In this step, it is preferable to provide a prepared solution in which the concentration of the heterocyclic compound is 0.1 mol/L or more, more preferably 0.2 mol/L or more. In this step, it is preferable to provide a prepared solution in which the concentration of the heterocyclic compound is 5 mol/L or less. A concentration in this range allows spray drying in the subsequent step to be more readily performed.

In the step (b), the prepared solution provided in the step (a) is spray-dried with a spray dryer to thereby precipitate a crystalline viologen compound in which alkali metal cations of the alkali metal compound are bound to oxygen anions of the carboxylic acid contained in the heterocyclic compound. This viologen compound is the viologen compound according to the present disclosure described above and includes a heterocyclic moiety in which a carboxylate of an alkali metal is bound directly or indirectly to both ends of a basic skeleton containing 4,4□-bipyridinium and an anionic moiety that pairs with 4,4□-bipyridinium. The spray-drying conditions may be appropriately adjusted, for example, by the scale of an apparatus and the amount of electrode active material to be produced. For example, the drying temperature is preferably in the range of 100° C. or higher and 250° C. or lower. At 100° C. or higher, the solvent can advantageously be removed sufficiently, and at 250° C. or lower, the energy consumption can advantageously be reduced. The drying temperature is more preferably 120° C. or higher and 230° C. or lower. Although depending on the amount to be produced, the feed rate of the solution may be, for example, in the range of 0.1 L/h or more and 2 L/h or less. Although depending on the amount to be produced, the size of a nozzle for spraying the prepared solution may be, for example, in the range of 0.5 mm or more and 5 mm or less in diameter. Performing spray-drying in this manner allows alkali metal cations of the alkali metal compound to be bound to oxygen anions of the carboxylic acid in the heterocyclic compound.

Figure 2:
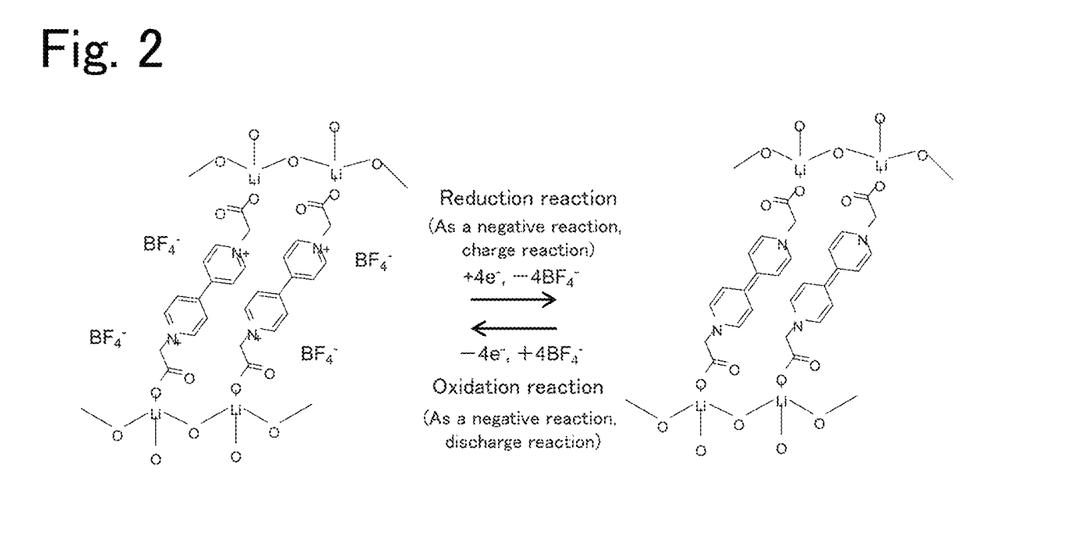
FIG. 2 schematically shows an example of how a viologen compound according to the present disclosure is oxidized and reduced.

Next, a negative electrode active material according to the present disclosure will be described. The negative electrode active material includes the viologen compound according to the present disclosure described above. The negative electrode active material is capable of giving and receiving anions. In the negative electrode active material, during charge, anions of the anionic moieties are probably released from inside the structure of the viologen compound to reduce the negative electrode active material, and during discharge, these anions are probably absorbed into the structure of the viologen compound to oxidize the negative electrode active material. FIG. 2 schematically shows an example of how the viologen compound is oxidized and reduced during charge and discharge.

Figure 3:
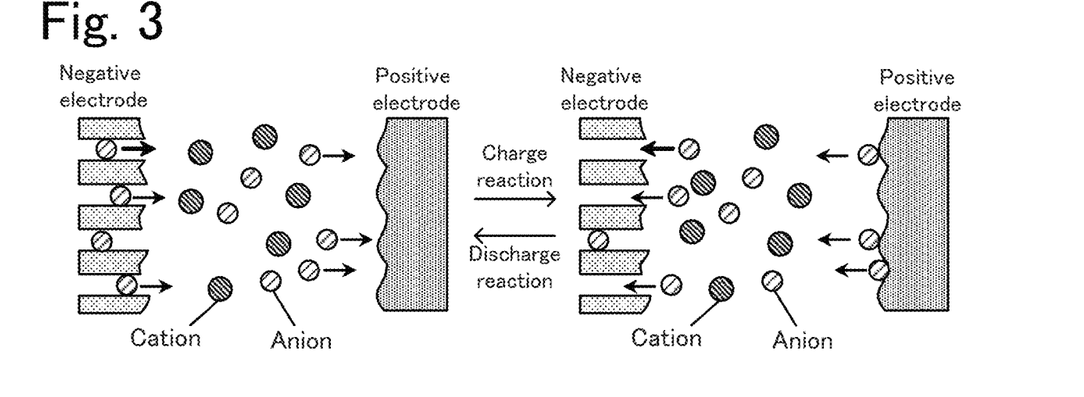
FIG. 3 schematically shows an exemplary working principle of an electricity storage device according to the present disclosure.

Next, an electricity storage device according to the present disclosure will be described. The electricity storage device according to the present disclosure includes a negative electrode containing the above-described negative electrode active material, a positive electrode containing a positive electrode active material capable of giving and receiving anions, and an ion-conducting medium that is disposed between the positive electrode and the negative electrode and conducts anions. Being capable of giving and receiving anions refers to being capable of absorbing and releasing anions into and from the material and/or being capable of adsorbing and desorbing anions onto and from the surface of the material. In the electricity storage device, during charge, anions are released or desorbed from the negative electrode, and the anions are absorbed into or adsorbed onto the positive electrode, and during discharge, anions are released or desorbed from the positive electrode, and the anions are absorbed into or adsorbed onto the negative electrode. Since anions are involved in charge and discharge at the positive electrode and the negative electrode, the electricity storage device is far less likely to run the risk of, for example, alkali metal precipitation and safer than lithium-ion batteries and the like. In addition, since charge and discharge reactions are allowed to proceed only by anion migration and the change in anion concentration in an electrolyte solution is small, the electricity storage device requires a less amount of electrolyte solution and can have a higher energy density than reserve batteries and the like. The electricity storage device may be, for example, a capacitor that uses an anion-releasing negative electrode. FIG. 3 schematically shows an exemplary working principle of a capacitor that uses an anion-releasing negative electrode, which is an example of the electricity storage device according to the present disclosure. In the capacitor that uses an anion-releasing negative electrode, during charge, anions are released from a negative electrode, and the anions are adsorbed onto a positive electrode, and during discharge, anions are desorbed from the positive electrode, and the anions are absorbed into the negative electrode.

The positive electrode of the electricity storage device may be formed, for example, by mixing together a positive electrode active material, a conductor, and a binder, adding a suitable solvent to the mixture to prepare a paste-like positive electrode material, applying the paste-like positive electrode material to the surface of a current collector, followed by drying, and optionally compressing the dried positive electrode material for higher electrode density. The positive electrode active material may be any material that is capable of giving and receiving anions, and examples include carbon materials, anion-exchange conductive polymers, and metal oxides. Examples of carbon materials include graphite, carbon black, and activated carbon, and carbon materials containing graphite as a principal component are preferred. Here, "containing graphite as a principal component" refers to containing graphite in an amount of 50% or more, preferably 90% or more, more preferably 95% or more. The positive electrode active material, if having such a composition, may contain amorphous carbon or other active materials. Examples of graphites include natural graphite (flaky graphite, scaly graphite) and artificial graphite, and artificial graphite is preferred because it can increase the potential of the electricity storage device and increase the energy density. Alkali-activated artificial graphite is more preferred because it has a wider interlayer gap that allows ions to readily come in and out, leading to improved output characteristics. Specifically, graphite can be alkali-activated by adding an alkali such as Na or K to the graphite and treating the resulting graphite at a high temperature of 600° C. to 1000° C. in an inert atmosphere. Examples of anion-exchange conductive polymers include viologen polymers. Using activated carbon, graphite, or an anion-exchange conductive polymer as the positive electrode active material advantageously facilitates reversible exchange of anions.

The conductor may be any electron-conducting material that does not adversely affect the electrode performance. For example, graphites such as natural graphite (flaky graphite, scaly graphite) and artificial graphite, acetylene black, carbon black, Ketjen black, carbon whisker, needle coke, carbon fiber, and metals (e.g., copper, nickel, aluminum, silver, and gold) can be used alone or as a mixture of two or more. Of these conductors, carbon black and acetylene black are preferred from the viewpoint of electron conductivity and coatability. The binder functions to bind active material particles and conductor particles together. For example, fluorine-containing resins such as polytetrafluoroethylene (PTFE), polyvinylidene fluoride (PVDF), and fluororubbers, thermoplastic resins such as polypropylene and polyethylene, ethylene-propylene-diene monomer (EPDM), sulfonated EPDM, and natural butyl rubber (NBR) can be used alone or as a mixture of two or more. Examples of solvents for dispersing the active material, the conductor, and the binder includes organic solvents such as N-methylpyrrolidone, dimethylformamide, dimethylacetamide, methyl ethyl ketone, cyclohexanone, methyl acetate, methyl acrylate, diethyltriamine, N,N-dimethylaminopropylamine, ethylene oxide, and tetrahydrofuran. The active material may also be slurried, for example, with an SBR latex in water with a dispersant and a thickener added. Examples of thickeners include polysaccharides such as carboxymethylcellulose and methylcellulose, which can be used alone or as a mixture of two or more. Examples of coating techniques include roller coating using applicator rollers, screen coating, doctor blade coating, spin coating, and bar coating, any of which can be used to provide any thickness and shape. Examples of positive electrode current collectors include aluminum, titanium, stainless steel, nickel, iron, baked carbon, conductive polymers, conductive glass, and collectors formed by surface-treating aluminum, copper, and the like with carbon, nickel, titanium, silver, and the like for improved adhesion, conductivity, and oxidation resistance. These collectors can also be surface-treated by oxidation. Examples of shapes of collectors include foils, films, sheets, nets, punched or expanded shapes, laths, porous shapes, foams, and fiber bundles. The collector has a thickness of, for example, 1 to 500 μm.

The negative electrode of the electricity storage device may be formed, for example, by mixing together a negative electrode active material, a conductor, and a binder, adding a suitable solvent to the mixture to prepare a paste-like electrode mixture, applying the paste-like electrode mixture to the surface of a current collector, followed by drying, and optionally compressing the dried electrode mixture for higher electrode density. The above-described viologen compound is used as the negative electrode active material. The conductor, the binder, and the solvent used for the negative electrode may be the same as those used for the positive electrode. Examples of negative electrode current collectors include copper, nickel, stainless steel, titanium, aluminum, baked carbon, conductive polymers, conductive glass, Al—Cd alloys, and collectors formed by surface-treating copper and the like with carbon, nickel, titanium, silver, and the like for improved adhesion, conductivity, and reduction resistance. These collectors can also be surface-treated by oxidation. The shape of the current collector may be the same as that of the positive electrode current collector.

The ion-conducting medium of the electricity storage device may be a medium that is able to conduct anions. For example, non-aqueous electrolyte solutions and non-aqueous gel electrolyte solutions containing supporting electrolytes can be used. The ion-conducting medium may contain an ionic liquid or an organic solvent such as a carbonate-based solvent. When a carbonate-based organic solvent is contained, freezing at low temperatures can be prevented, and low-temperature characteristics such as output characteristics at low temperatures can be improved. In addition, adding a carbonate-based organic solvent can reduce the viscosity to improve the output characteristics. Examples of organic solvents include cyclic carbonates such as ethylene carbonate, propylene carbonate, vinylene carbonate, butylene carbonate, and chloroethylene carbonate; linear carbonates such as dimethyl carbonate, ethyl methyl carbonate, diethyl carbonate, ethyl-n-butyl carbonate, methyl-t-butyl carbonate, di-i-propyl carbonate, and t-butyl-i-propyl carbonate; cyclic esters such as γ-butyl lactone and γ-valerolactone; linear esters such as methyl formate, methyl acetate, ethyl acetate, and methyl butyrate; ethers such as dimethoxyethane, ethoxymethoxyethane, and diethoxyethane; nitriles such as acetonitrile and benzonitrile; furans such as tetrahydrofuran and methyltetrahydrofuran; sulfolanes such as sulfolane and tetramethylsulfolane; and dioxolanes such as 1,3-dioxolane and methyldioxolane. Of these, combinations of cyclic carbonates and linear carbonates are preferred.

An ionic liquid is a salt that is formed from a cation and an anion and that is melted at normal temperature. Examples of cations include imidazoliums, ammoniums, cholines, pyridiniums, and piperidiniums. Examples of imidazoliums include 1-(hydroxyethyl)-3-methylimidazolium and 1-methyl-3-octylimidazolium. Examples of ammoniums include N,N-dimethylammonium and tetrabutylammonium. Examples of pyridiniums include 1-butyl-3-methylpyridinium and 1-butylpyridinium. Examples of piperidiniums include 1-ethyl-1-methylpiperidinium. The anion may be at least one selected from $BF_4^-$, $PF_6^-$, $ClO_4^-$, $CF_3SO_3^-$, $TFSI^-$, $BETI^-$, $Br^-$, $Cl^-$, and $F^-$. Specific examples of salts formed from $BF_4^-$ anions include diethylmethyl (2-methoxyethyl) ammonium.$BF_4$. Specific examples of salts formed from TFSI anions include N-methyl-N-propylpiperidinium bis (trifluoromethanesulfonyl)imide (PP13TFSI), 1-ethyl-3-methyl-imidazolium bis(trifluoromethanesulfonyl)imide (EMITFSI), N,N,N-trimethyl-N-propylammonium bis(trifluoromethanesulfonyl)imide (TMPATFSI), and N,N-diethyl-N-methyl-N-(2-methoxyethyl)ammonium bis(trifluoromethanesulfonyl)imide. Of these, diethylmethyl (2-methoxyethyl)ammonium.$BF_4$ is preferred. When an ionic liquid and an organic solvent are used as a mixture, the concentration of the ionic liquid is preferably 0.5 M or more and 2.0 M or less.

Examples of supporting electrolytes include $LiPF_6$, $LiBF_4$, $LiAsF_6$, $LiCF_3SO_3$, $LiN(CF_3SO_2)_2$, $LiC(CF_3SO_2)_3$, $LiSbF_6$, $LiSiF_6$, $LiAlF_4$, LiSCN, $LiClO_4$, LiCl, LiF, LiBr, LiI, and $LiAlCl_4$. The concentration of the supporting electrolyte in a non-aqueous electrolyte solution is preferably 0.1 mol/L or more and 5 mol/L or less, more preferably 0.5 mol/L or more and 2 mol/L or less. A concentration of the supporting electrolyte of 0.1 mol/L or more can provide a sufficient current density, and a concentration of the supporting electrolyte of 5 mol/L or less can enhance the stability of the electrolyte solution. The anion contained in the supporting electrolyte or the ionic liquid is preferably of the same type as the anionic moiety of the viologen compound. The cation is preferably of the same type as the alkali metal of the alkali metal carboxylate of the viologen compound. A flame retardant such as a phosphorus flame retardant or a halogen flame retardant may be added to the non-aqueous electrolyte solution.

The electricity storage device according to the present disclosure may include a separator between the positive electrode and the negative electrode. The separator may have any composition that withstands the environment in which the electricity storage device is used. Examples include glass filters made of glass fiber, polymer nonwoven fabrics such as polypropylene nonwoven fabrics and polyphenylene sulfide nonwoven fabrics, and thin microporous membranes of olefin resins such as polyethylene and polypropylene. Of these, glass filters have good wettability to electrolyte solutions such as $BF_4$-based ionic liquids and can facilitate anion migration. These separators may be used alone or in combination.

The shape of the electricity storage device according to the present disclosure may be, for example, but is not limited to, coin-like, button-like, sheet-like, laminated, cylindrical, flat, or prismatic. The electricity storage device may also be of large type for use in, for example, an electric vehicle.

The viologen compound according to the present disclosure described in detail above is capable of giving and receiving anions. Thus, the viologen compound can provide a novel electricity storage device that is charged and discharged by anion migration and that uses anions as charge carriers. This effect is produced presumably because as a result of instantaneously forming crystals with a spray dryer, a network via desired bonding is formed, and paths capable of giving and receiving anions are formed in the crystals, thus enabling reversible charge and discharge by giving and receiving anions. Since the electricity storage device according to the present disclosure uses anions as carriers, it is far less likely to be short-circuited by an overload, for example, than Li-ion batteries. The electricity storage system behaves like a capacitor in taking anions in and out and thus promises to provide high power. The electrodes constituting the electricity storage device are very easy to manufacture because they are both stable in air.

In this regard, the present disclosure is not limited to the above-described examples and can be realized in various forms within the technical scope of the present disclosure, as a matter of course.

EXAMPLES

In the following, examples in which the viologen compound according to the present disclosure was actually synthesized and used as an active material for an electricity storage device will be described as Examples. Experimental Examples 1 and 2 correspond to Examples, and Experimental Examples 3 to 5 correspond to Comparative Examples.

Synthesis of Dilithium Viologen Dicarboxylate

Experimental Example 1

Dilithium viologen dicarboxylate, an example of the viologen compound according to the present disclosure, was synthesized according to the following synthesis scheme.

[Chem. 3]

-continued (1) In 200 mL of acetonitrile, 7.0 g of 4,4□-bipyridine and 15.0 g of ethyl bromoacetate were dissolved, and the resulting solution was heated to reflux for 24 hours. After being cooled to room temperature, the solution was filtered and washed with ethanol to obtain a synthetic intermediate (1).

(2) In 120 mL of a 10% aqueous hydrochloric acid solution, 21.0 g of the synthetic intermediate (1) was dissolved. The resulting solution was heated to reflux for 24 hours and cooled to room temperature to distill off the solvent, thereby obtaining a synthetic intermediate (2). The synthetic intermediate (2) is a known material (Dalton Trans., 2010, vol. 39, pp. 7714-7722).

(3) In 100 mL of water, 16.0 g of the synthetic intermediate (2) was dissolved, and 50 mL of water with 13.8 g of lithium tetrafluoroborate dissolved therein was added and stirred. The resulting powder was filtered and washed with ethanol to obtain a synthetic intermediate (3).

(4) In 30 mL of water, 5.00 g of the synthetic intermediate (3) was dissolved, and 25 mL of water with 0.58 g of lithium hydroxide dissolved therein was added and stirred. An aqueous solution prepared so as to have a molar ratio B/A, which is the ratio of the molarity of lithium hydroxide to the molarity A of viologen dicarboxylic acid, of 2.2 was sprayed and dried with a spray dryer (Mini Spray Dryer B-290, manufactured by Nihon BUCHI K.K.) at a drying air temperature of 150° C. and a raw material solution spray rate of about 400 mL/h. The nozzle used was 1.5 mm in diameter. In this manner, target dilithium viologen dicarboxylate was obtained. This was used as a sample of Experimental Example 1.

Experimental Examples 2 to 4

A sample of Experimental Example 2 was synthesized in the same manner as in Experimental Example 1 except that the drying air temperature was 200° C. in the step (4). A sample of Experimental Example 3 was synthesized in the same manner as in Experimental Example 2 except that the molar ratio B/A was 3.0 in the step (4). A sample of Experimental Example 4 was synthesized in the same manner as in Experimental Example 2 except that the molar ratio B/A was 4.0 in the step (4).

Experimental Example 5

The syntheses of (1) to (3) were performed in the same manner as in Experimental Example 1. In the step (4), 4.5 g of the synthetic intermediate (3) was suspended in 30 mL of water, 20 mL of water with 0.5 g of lithium hydroxide dissolved therein was added, and the resulting solution was heated to 50° C. and stirred under a reduced pressure of 1000 Pa. After cooling to room temperature, the resulting microcrystals were filtered. The molar ratio B/A was 2.2. The viologen compound thus obtained was used as a sample of Experimental Example 5.

Manufacture of Dilithium Viologen Dicarboxylate Electrode

To 65% by mass of the dilithium viologen dicarboxylate produced in the above-described manner, 15% by mass of carbon black (Tokai Carbon Co., Ltd., TB5500) serving as a particulate carbon conductor, 10% by mass of a vapor-grown carbon fiber (VGCF, Showa Denko K.K.) serving as a fibrous carbon conductor, and 10% by mass of polyvinylidene fluoride (KF Polymer, manufactured by Kureha Corporation) serving as a binder, an appropriate amount of N-methyl-2-pyrrolidone was added as a dispersant to prepare a slurry mixture. The slurry mixture was uniformly applied to a 10 μm thick copper foil current collector such that the amount of dilithium viologen dicarboxylate, serving as an active material, per unit area was 10 g/m² and dried by heating at 120° C. under vacuum to produce a coated sheet. The coated sheet was then pressed and punched into a disk-shaped electrode having an area of 2 cm².

Manufacture of Two-Electrode Test Cell

To a non-aqueous solvent mixture of ethylene carbonate, dimethyl carbonate, and ethyl methyl carbonate at a volume ratio of 30:40:30, $LiBF_4$ serving as a supporting electrolyte was added at 1.0 mol/L to prepare a non-aqueous electrolyte solution. A separator (manufactured by Toray Tonen Specialty Separator Godo Kaisha) impregnated with the non-aqueous electrolyte solution was sandwiched between the dilithium viologen dicarboxylate electrode manufactured by the above-described method, serving as a working electrode, and a lithium metal foil (300 μm in thickness), serving as a counter electrode, to manufacture a two-electrode test cell.

Charge-Discharge Test

In an environment at 20° C., the two-electrode test cell obtained above was reduced to 1.0 V (or 1.5 V) at 0.03 mA and then oxidized to 3.4 V (or 3.0 V) at 0.03 mA. This reduction-oxidation procedure was performed a total of ten times. The reduction capacity and the oxidation capacity in each procedure were determined. The reduction capacity was used as a discharge capacity, and the oxidation capacity was used as a charge capacity. The amount (differential value) of change in capacity with respect to potential difference was calculated from charge-discharge curves of the 2nd, 5th, and 10th cycles, and differential curves corresponding to charge and discharge reaction potentials were drawn.

Experimental Results

Figure 4A:
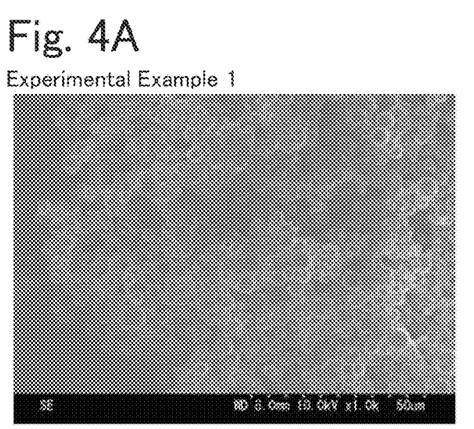
FIGS. 4A to 4E show SEM pictures of samples of Experimental Examples 1 to 5.
Figure 4B:
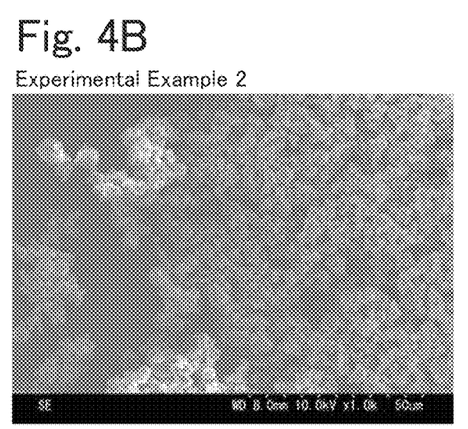
Figure 4C:
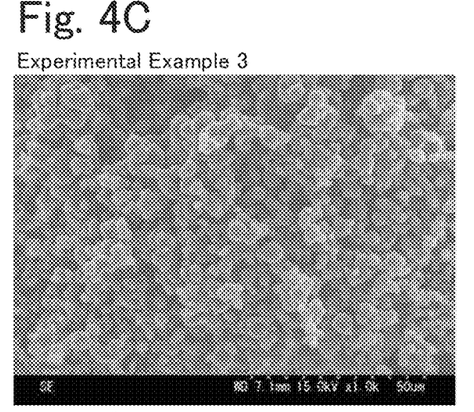
Figure 4D:
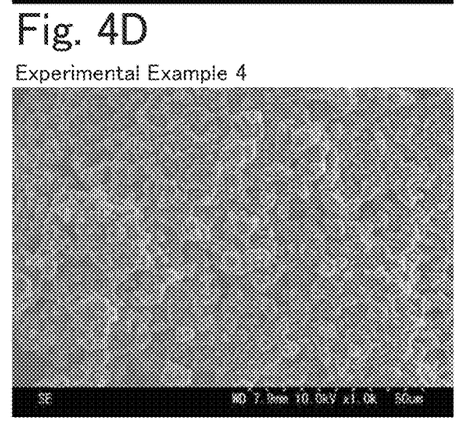
Figure 4E:
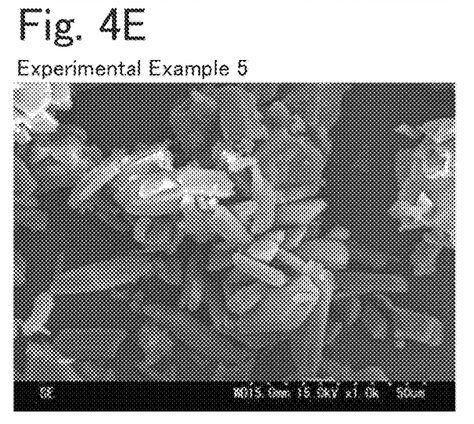

FIGS. 4A to 4E show SEM pictures of the synthesized samples. FIG. 4A is an SEM picture of the sample of Experimental Example 1, FIG. 4B is an SEM picture of the sample of Experimental Example 2, FIG. 4C is an SEM picture of the sample of Experimental Example 3, and FIG. 4D is an SEM picture of the sample of Experimental Example 5. These SEM pictures show that the sample of Experimental Example 5, which was obtained by removing the solvent by heating under reduced pressure, took the form of bars, whereas the samples of Experimental Examples 1 to 4, which were obtained by spray drying, took the form of spheres. In Experimental Example 5, the particles were relatively large so as to have a length of about 20 μm, whereas in Experimental Examples 1 to 4, small particles having a size of 10 μm or less were observed. When the percentage of Li was high, as in Experimental Example 3 and Experimental Example 4, spherical particles aggregated in spray drying.

Figure 5:
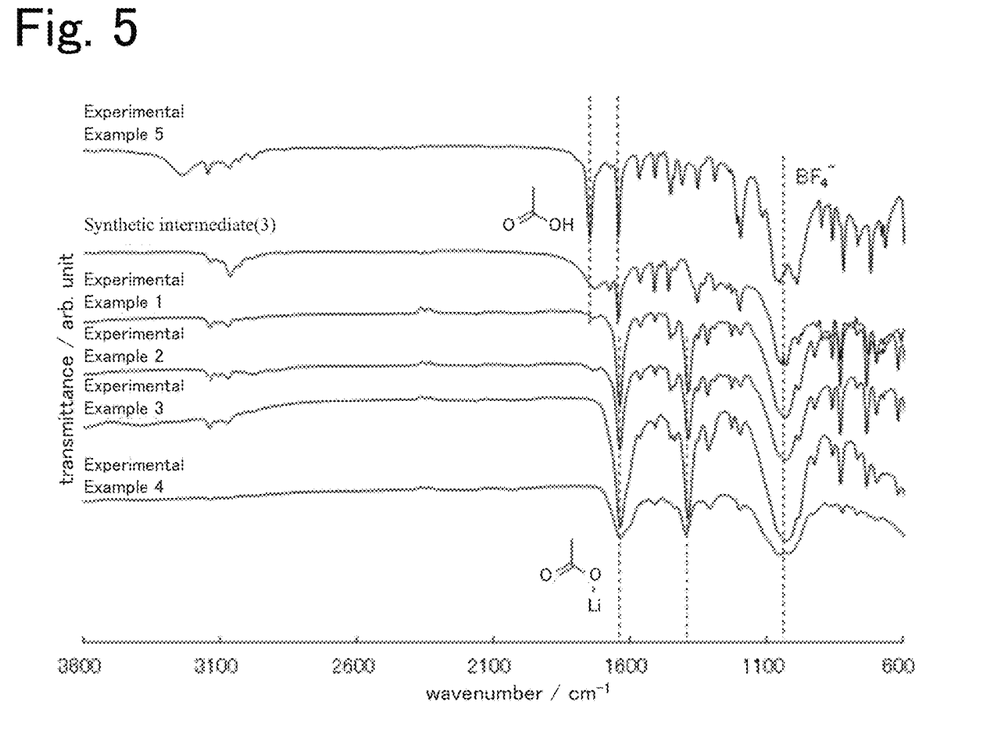
FIG. 5 shows IR spectra of the samples of Experimental Examples 1 to 5.

FIG. 5 shows IR spectra of the synthesized samples. The IR spectra were measured with a ThermoNicolet Avatar 360 FT-IR. The samples were all determined to have absorptions attributed to $BF_4$ anions near 1000 $cm^{-1}$. This means that bromo ions were exchanged with $BF_4$ anions in synthesizing the synthetic intermediate (3). Absorptions attributed to carboxy groups were also observed in the range of 1400 $cm^{-1}$ to 1750 $cm^{-1}$. In Experimental Example 5, which was obtained by heating under reduced pressure, the absorption position was the same as the synthetic intermediate (3), whereas in Experimental Examples 1 to 4, which were obtained by spray drying, changed absorption peaks corresponding to Li carboxylate were observed.

Figure 6A:
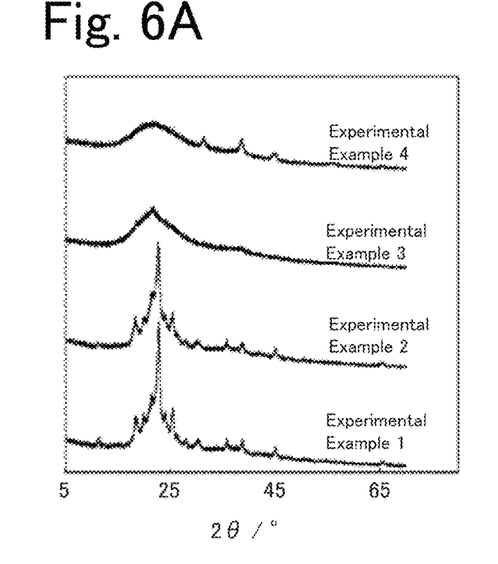
FIGS. 6A and 6B show XRD profiles of the samples of Experimental Examples 1 to 5.
Figure 6B:
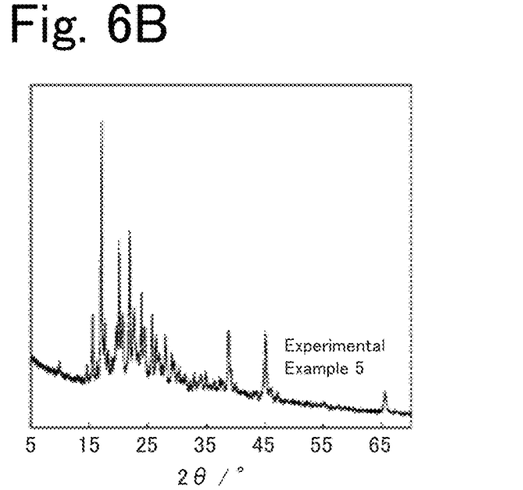

FIGS. 6A and 6B show XRD profiles of the synthesized samples. FIG. 6A shows XRD profiles of Experimental Examples 1 to 4, and FIG. 6B shows an XRD profile of Experimental Example 5. The XRD measurement was performed with a Rigaku RINT-TTR using Cu—K radiation. In Experimental Example 5, which was obtained by heating under reduced pressure, a sharp peak indicating crystallinity was observed. Also in Experimental Examples 1 and 2, which were obtained by spray drying, sharp peaks indicating crystallinity were observed, but when the percentage of Li was high as in Experimental Examples 3 and 4, broad peaks were observed, showing that an increased amount of lithium hydroxide in spray-dry synthesis resulted in amorphous materials having low crystallinity.

Figure 7:
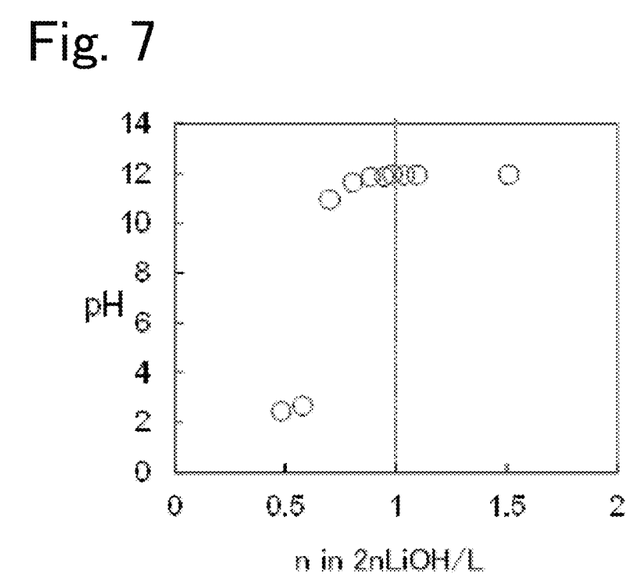
FIG. 7 shows the results of titration of a synthetic intermediate 3 with an aqueous LiOH solution.

FIG. 7 shows the results of titration of the synthetic intermediate (3) with an aqueous LiOH solution. If the dilithium viologen dicarboxylate (4) is obtained only by mixing the synthetic intermediate (3) and LiOH together, the pH should significantly change around n=1 as a result of neutralization reaction of two carboxy groups in the synthetic intermediate (3) and lithium hydroxide. However, the pH actually changed around n=0.5 where one carboxy group and lithium hydroxide reacted together, and neutralization reaction did not proceed. This shows that lithium hydroxide did not react with carboxy groups and the dicarboxylic acid state of the synthetic intermediate (3) was stably present in the solution, meaning that the dilithium viologen dicarboxylate (4) cannot be obtained only by mixing the synthetic intermediate (3) and LiOH together.

Figure 8A:
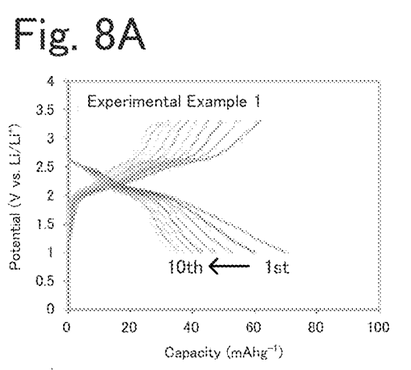
FIGS. 8A to 8D show charge-discharge curves obtained when single-electrode charge and discharge of electrodes manufactured using the samples of Experimental Examples 1 and 3 to 5 was performed.
Figure 8B:
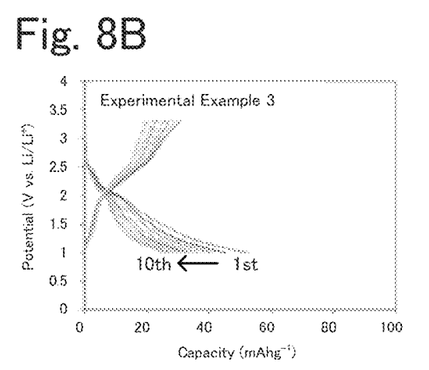
Figure 8C:
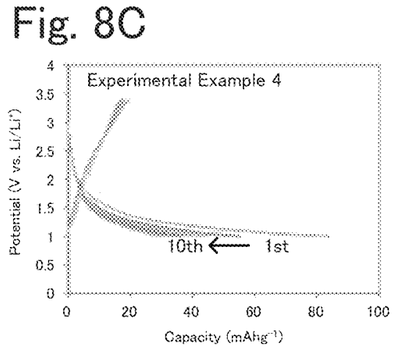
Figure 8D:
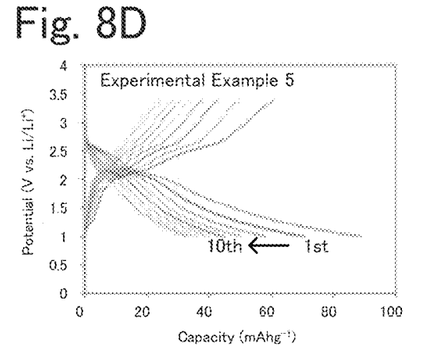
Figures 9A, 9B:
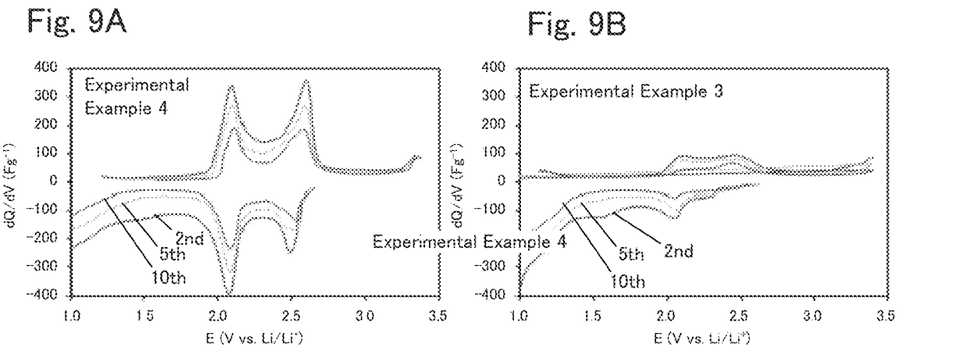
FIGS. 9A to 9D show differential curves obtained when single-electrode charge and discharge of the electrodes manufactured using the samples of Experimental Examples 1 and 3 to 5 was performed.
Figure 9C:
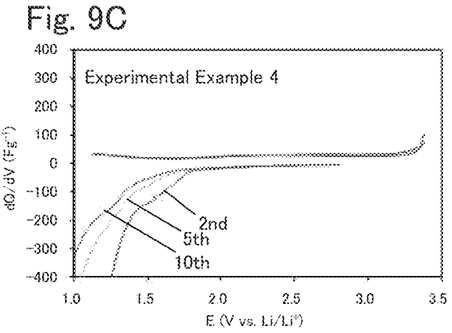
Figure 9D:
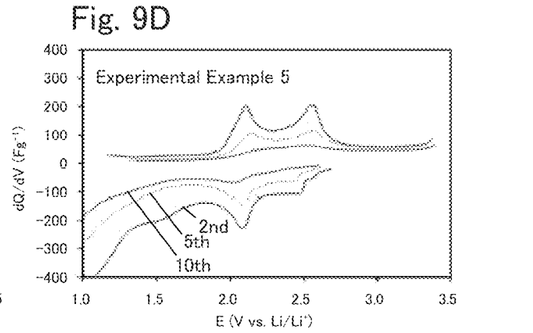

FIGS. 8A to 8D show charge-discharge curves obtained when single-electrode charge and discharge of the electrodes manufactured using the synthesized samples was performed. FIG. 8A is a charge-discharge curve of Experimental Example 1, FIG. 8B is a charge-discharge curve of Experimental Example 3, FIG. 8C is a charge-discharge curve of Experimental Example 4, and FIG. 8D is a charge-discharge curve of Experimental Example 5. FIGS. 9A to 9D show differential curves obtained when single-electrode charge and discharge of the electrodes manufactured using the synthesized samples was performed. FIG. 9A is a differential curve of Experimental Example 1, FIG. 9B is a differential curve of Experimental Example 2, FIG. 9C is a differential curve of Experimental Example 3, and FIG. 9D is a differential curve of Experimental Example 4. FIGS. 8 and 9 show the results obtained when charge and discharge were performed at charging and discharging voltages of 1.0 to 3.4 V. In Experimental Example 1, which was synthesized by spray drying to be crystalline, a high capacity was achieved in contrast to Experimental Example 5, which was obtained by heating under reduced pressure. However, in Experimental Example 3 and Experimental Example 4, which were synthesized by spray drying but under high Li-content conditions to be amorphous, the capacities were low. The differential curves show that the electrochemical activity was higher in Experimental Example 1 than in Experimental Examples 3 to 5.

Figure 10A:
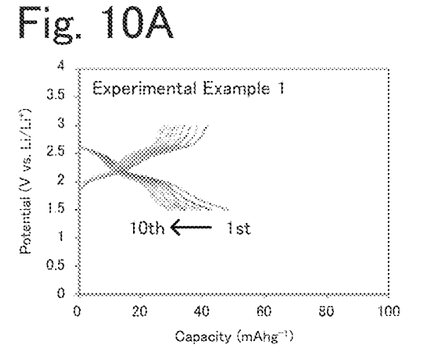
FIGS. 10A to 10C show charge-discharge curves obtained when single-electrode charge and discharge of electrodes manufactured using the samples of Experimental Examples 1, 2, and 5 was performed.
Figure 10B:
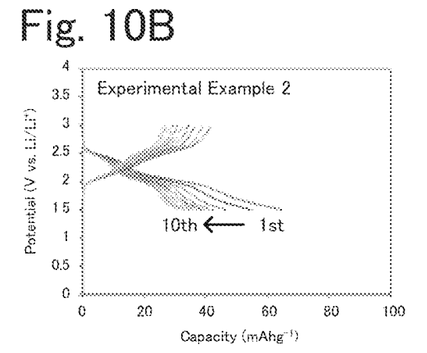
Figure 10C:
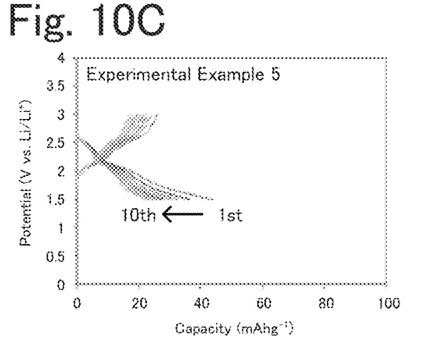
Figure 11A:
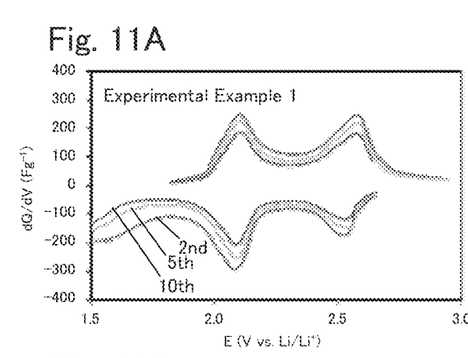
FIGS. 11A to 11C show differential curves obtained when single-electrode charge and discharge of the electrodes manufactured using the samples of Experimental Examples 1, 2, and 5 was performed.
Figure 11B:
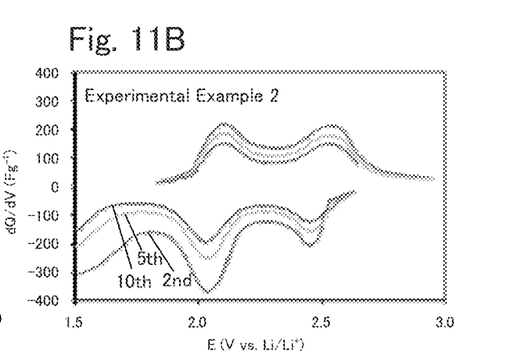
Figure 11C:
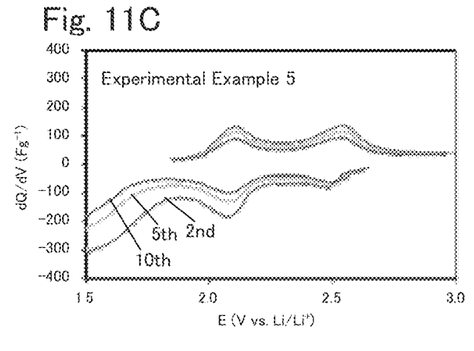

FIGS. 10A to 10C show charge-discharge curves obtained when single-electrode charge and discharge of the electrodes manufactured using the synthesized samples was performed. FIG. 10A is a charge-discharge curve of Experimental Example 1, FIG. 10B is a charge-discharge curve of Experimental Example 2, and FIG. 10C is a charge-discharge curve of Experimental Example 5. FIGS. 11A to 11C show differential curves obtained when single-electrode charge and discharge of the electrodes manufactured using the synthesized samples was performed. FIG. 11A is a differential curve of Experimental Example 1, FIG. 11B is a differential curve of Experimental Example 2, and FIG. 11C is a differential curve of Experimental Example 3. FIGS. 10 and 11 show the results obtained when charge and discharge were performed at charging and discharging voltages of 1.5 to 3.0 V. Also under these conditions, high capacities were discharged in Experimental Examples 1 and 2, which were synthesized by spray drying to be crystalline, in contrast to Experimental Example 5, which was obtained by heating under reduced pressure. The differential curves show that the electrochemical activity was higher in Experimental Examples 1 and 2 than in Experimental Example 5.

From the above, it can be seen that the viologen compound according to the present disclosure can be obtained by spray drying. In particular, in Experimental Examples 1 and 2, in which the molar ratio B/A was 2 to 2.5, crystalline compounds were obtained, and the compounds were good particularly in charge and discharge characteristics. The compounds of Experimental Examples 1 and 2 are presumed, from their crystallinity, structural formulae, and other factors, to have a structure as shown in FIG. 1. Specifically, the compounds are presumed to be three-dimensional structures including a heterocyclic moiety that includes an organic skeletal layer in which a carboxylic acid anion is bound directly or indirectly to both ends of a basic skeleton and that includes an alkali metal element layer in which an alkali metal is bound to oxygen contained in the carboxylic acid anion. In such a three-dimensional structure, for example, the organic skeletal layer to which the alkali metal is bound has space, and anions are probably absorbed into and released from the space. The three-dimensional structure is presumed, for example, to be formed in layers by π-electron interaction of an aromatic heterocyclic compound, to have a structure in which the organic skeletal layers are joined by the alkali metal element, and to have a structure in which four oxygen atoms of different carboxylic acid anions and one alkali metal element are bound together.

The present application claims priority on the basis of the Japanese Patent Application No. 2017-235808 filed on Dec. 8, 2017, the entire contents of which are incorporated herein by reference.

What is claimed is:
1. A crystalline viologen compound comprising:
a heterocyclic moiety in which a carboxylate of an alkali metal is bound directly or indirectly to both ends of a basic skeleton containing 4,4'-bipyridinium; and
an anionic moiety that pairs with the 4,4'-bipyridinium, wherein the viologen compound is represented by formula (1):

[chem. 1]

Formula (1)

where $A^-$ is the anionic moiety, M is lithium, R is an alkylene chain or an aromatic hydrocarbon chain, and m is 0 or 1.

2. The viologen compound according to claim 1, wherein the anionic moiety is at least one selected from the group consisting of $BF_4^-$, $PF_6^-$, $SiF_6^{2-}$, $SbF_6^-$, $ClO_4^-$, $B(CN)_4^-$, $[(C_2F_5)_3PF_3]^-$, $[(CN)_2N]^-$, $CF_3SO_3^-$, $CF_3CO_2^-$, $N(FSO_2)_2^-$, $N(CF_3SO_2)_2^-$, and $N(C_2F_5SO_2)_2^-$.

3. The viologen compound according to claim 1, wherein the viologen compound is represented by formula (2) or formula (3):

[chem. 2]

Formula (2)

Formula (3)

4. A crystalline viologen compound comprising:
a heterocyclic moiety in which a carboxylate of an alkali metal is bound directly or indirectly to both ends of a basic skeleton containing 4,4'-bipyridinium; and
an anionic moiety that pairs with the 4,4'-bipyridinium,
wherein the heterocyclic moiety is a three-dimensional structure including an organic skeletal layer in which a carboxylic acid anion is bound directly or indirectly to the both ends of the basic skeleton and an alkali metal element layer in which the alkali metal is bound to oxygen contained in the carboxylic acid anion.

5. A method for producing a viologen compound, comprising:
a step (a) of providing a heterocyclic compound and an alkali metal compound, the heterocyclic compound including a heterocyclic moiety in which a carboxylic acid is bound directly or indirectly to both ends of a basic skeleton containing 4,4'-bipyridinium and an anionic moiety that pairs with the 4,4'-bipyridinium, and providing a prepared solution in which a molar ratio of alkali metal cations of the alkali metal compound to the heterocyclic compound is 2.0 or more and 2.5 or less; and
a step (b) of spray-drying the prepared solution with a spray dryer to thereby precipitate a crystalline viologen compound in which the alkali metal cations of the alkali metal compound are bound to oxygen anions of the carboxylic acid contained in the heterocyclic compound.

6. The method for producing a viologen compound according to claim 5, wherein in the step (a), a prepared solution in which a molar ratio of the alkali metal compound to the heterocyclic compound is 2.1 or more and 2.3 or less is provided.

7. A negative electrode active material comprising a crystalline viologen compound comprising:
a heterocyclic moiety in which a carboxylate of an alkali metal is bound directly or indirectly to both ends of a basic skeleton containing 4,4'-bipyridinium; and
an anionic moiety that pairs with the 4,4'-bipyridinium.

8. An electricity storage device comprising:
a negative electrode containing the negative electrode active material according to claim 7;
a positive electrode containing a positive electrode active material capable of giving and receiving anions; and
an ion-conducting medium that is disposed between the positive electrode and the negative electrode and conducts anions.

* * * * *